United States Patent
Kovarik, Jr.

[11] Patent Number: 6,014,628
[45] Date of Patent: Jan. 11, 2000

[54] METHOD AND SYSTEM FOR TRACKING ANY ENTITY THROUGH ANY SET OF PROCESSES UTILIZING A TEMPORAL PROJECTION

[75] Inventor: Vincent J. Kovarik, Jr., Melbourne, Fla.

[73] Assignee: Exigent International, Inc., Melbourne, Fla.

[21] Appl. No.: 09/135,389

[22] Filed: Aug. 17, 1998

Related U.S. Application Data

[60] Provisional application No. 60/064,128, Nov. 3, 1997.

[51] Int. Cl.[7] ................................................ G06F 17/60
[52] U.S. Cl. .................. 705/1; 705/5; 705/8; 705/22; 705/28; 364/478.14
[58] Field of Search ..................... 705/1, 5, 28, 22; 364/478, 478.14; 345/333, 335

[56] References Cited

U.S. PATENT DOCUMENTS

| | | | |
|---|---|---|---|
| 4,373,185 | 2/1993 | Mills et al. | 364/478.03 |
| 4,832,204 | 5/1989 | Handy et al. | 209/3.3 |
| 5,038,283 | 8/1991 | Caveney | 705/28 |
| 5,225,990 | 7/1993 | Bunce et al. | 364/478.14 |
| 5,289,372 | 2/1994 | Guthrie et al. | 705/28 |
| 5,299,116 | 3/1994 | Owens et al. | 705/28 |
| 5,311,424 | 5/1994 | Mukherjee et al. | 705/29 |
| 5,345,550 | 9/1994 | Bloomfield | 345/353 |
| 5,471,629 | 11/1995 | Risch | 707/201 |
| 5,548,756 | 8/1996 | Tantry et al. | 707/10 |
| 5,621,647 | 4/1997 | Kraemer et al. | 364/468.22 |
| 5,630,072 | 5/1997 | Dobbins | 705/22 |
| 5,680,551 | 10/1997 | Martino, II | 709/226 |
| 5,793,639 | 8/1998 | Yamazaki | 705/5 |

*Primary Examiner*—Emanuel Todd Voeltz
*Assistant Examiner*—Thomas A. Dixon
*Attorney, Agent, or Firm*—Quarles & Brady LLP

[57] ABSTRACT

A method and system for generically tracking an entity in a specific domain. The system includes a generic application interface for receiving and processing tracking data regarding a tracked item. The generic application interface is configured for user modification so that the interface may be customized for a specific tracking requirement.

A tracking engine is provided for abstracting the tracking data provided by the generic application interface to a set of generic object models. Each instantiated object comprising the generic object models encapsulates the tracking data pertaining to a tracked item. A tracking router is also provided for communicating at least one of the instantiated objects to a tracking station at a location for processing in accordance with an anticipated physical flow of the objects through a domain. As a result, instantiated object can be processed by the tracking engine independently of the specific tracking data contained therein.

34 Claims, 11 Drawing Sheets

METHOD AND SYSTEM FOR TRACKING ANY ENTITY THROUGH ANY SET OF PROCESSES UTILIZING A TEMPORAL PROJECTION

CROSS REFERENCE TO RELATED APPLICATIONS

This application is a continuation-in-part of pending provisional application Ser. No. 60/064.128, filed Nov. 3, 1997.

STATEMENT REGARDING FEDERALLY SPONSORED RESEARCH OR DEVELOPMENT (Not Applicable)

BACKGROUND OF THE INVENTION

1. Technical Field

This invention relates generally to computer systems for tracking objects and more specifically to a method and apparatus for providing a core representation of the tracking domain which can be applied to new tracking applications with minimal development of new software.

2. Description of the Related Art

Various tracking systems have been developed which permit individuals and objects to be tracked. Such systems have found utility in a variety of industries, including manufacturing and in the airport security. In the case of the airport security industry, for example such systems have been used specifically for badging as well as passenger and baggage tracking. Typically such systems have been constructed using various database products and application development languages.

Over time, efforts have been made to improve these types of tracking systems. Important goals have included increasing the overall performance of the system, upgrading the database back-end to operate with servers having higher speed and capacity, redesigning the operator interface screens to be more compliant with standard Windows applications so that they are easier to use, and redesigning the architecture to promote flexibility and expandability to other application domains.

These systems have encapsulated many of the components of computer based tracking systems into well defined categories or areas which have provided greater modularity of design, made the application easier to maintain, and easier to extend. Accordingly, such systems have made significant strides towards the logical encapsulation of related functionality in major tracking system components. These components include 1) improved user displays and forms which are isolated from the main body of the application code so that the interface can be customized without impacting the main application logic; 2) improved data base interfaces employing the Open Data Base Connection (ODBC) standard library to permit any relational database which provides an ODBC driver to be quickly implemented without impact or change to the main application code; 3) improved of the device interfaces, i.e. the collection of subroutines, libraries, and drivers which provide the interface to the physical devices and sensors connected to the tracking system and 4) improvements to the application code by using object-oriented principles and employing the class and object definition capabilities provided by advanced object oriented languages.

Recently, it has become apparent that despite the improvements in existing tracking systems, they have suffered from a significant drawback in that they were generally limited to a specific tracking application. As a result, such systems have been difficult to modify for alternative types of uses. For example, a tracking system designed for aircraft security could not easily be implemented as a tracking system for auto parts. This has resulted in increased design costs and a lack of consistency across tracking domains. Thus, a need has arisen to develop a tracking system having an overall architecture in which there exist common abstractions which were capable of being coalesced into a common design and architecture. This core set of common components could provide a foundation for applying tracking systems for one particular purpose to other application areas.

SUMMARY OF THE INVENTION

A method and system is provide for generically tracking an entity in a specific domain. The system includes a generic application interface for receiving and processing tracking data regarding a tracked item. The generic application interface is advantageously configured for user modification so that the interface may be customized for a specific tracking requirement. A tracking engine for abstracting the tracking data provided by the generic application interface to a set of generic object models is provided. Each instantiated object comprising the generic object models encapsulates the tracking data pertaining to the tracked item. A tracking router is included for providing at least one of the instantiated objects to a tracking station at a location for processing in accordance with an anticipated physical flow of the objects through a domain. A significant advantage of the invention is that one or more instantiated object models processed by the tracking engine are processed independently of the specific tracking data contained therein.

The system makes use of a tracked entity object for defining the entity which is to be tracked, a location object defining a physical space where the entity is operated upon; a process object for defining a process which is performed in relation to the entity, a flow object for defining a beginning and end of a series of the processes through a business scenario; and a domain object for providing a high level description of the collection of objects consisting of the tracked entity object, the location object, the process object and the flow object. Each of the tracked entity object; the location object, the process object and the flow object are configured to process generic operations and data values for a tracking application, but not the specific data values or operations of a particular domain.

The tracked entity object has a set of default properties which are configured to be user modified in order to apply the generic tracking engine to the specific domain and preferably includes an internal data structure for identifying the name and description of the tracked entity, when it was instantiated, and when it has completed processing through a flow.

The location object maps a process object to a physical place where an operation is performed upon the tracked object. The location object also preferably maps the entity to a physical place through which the entity transitions.

The process object maintains a pre and post process property list for the tracked entity object, the pre-process property list defining the expected state of a tracked object when it is received, and the post-process property list defining the expected state of the tracked object after it has been processed. The process object also maintains precedence relationships with subsequent processes within a flow.

The flow object defines an initial process and an ending process for the business flow. Finally, the domain object is primarily an administrative object which helps to organize the collection of processes, tracked Items, locations, and other objects which comprise a specific domain.

The foregoing objects are advantageously used in the method according to the invention to form a universal tracking abstraction. The method includes the steps of receiving in a domain specific tracking application, information concerning a tracked entity and physical operations performed relative thereto. This information is provided to a tracking server on which are defined each of the tracked entity object; location object, process object and flow object as described above. The objects are used to process in the tracking server a set of generic operations and data values for the tracking application.

In a preferred embodiment of the method, the tracked entity object has a set of default properties, and a user can modify the default properties in order to apply the tracking server to the specific domain. The method may also advantageously include the step of defining the tracked entity object to comprise an internal data structure for identifying the name and description of the tracked entity, when it was instantiated by the tracking application, and when it has completed processing through a flow.

The location object is used for mapping a particular process object to a physical place where an operation is performed upon the tracked object. The location object can also be used in accordance with the method to map the entity to a physical place through which the entity transitions.

According to one aspect, the method further involves the step of maintaining with the process object a pre and post process property list for the tracked entity object. The pre-process property list defines the expected state of a tracked object when it is received, and the post-process property list defining the expected state of the tracked object after it has been processed.

According to a further aspect of the method the process object is utilized to maintain a precedence relationship with subsequent processes within a the flow.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

Figure 1:
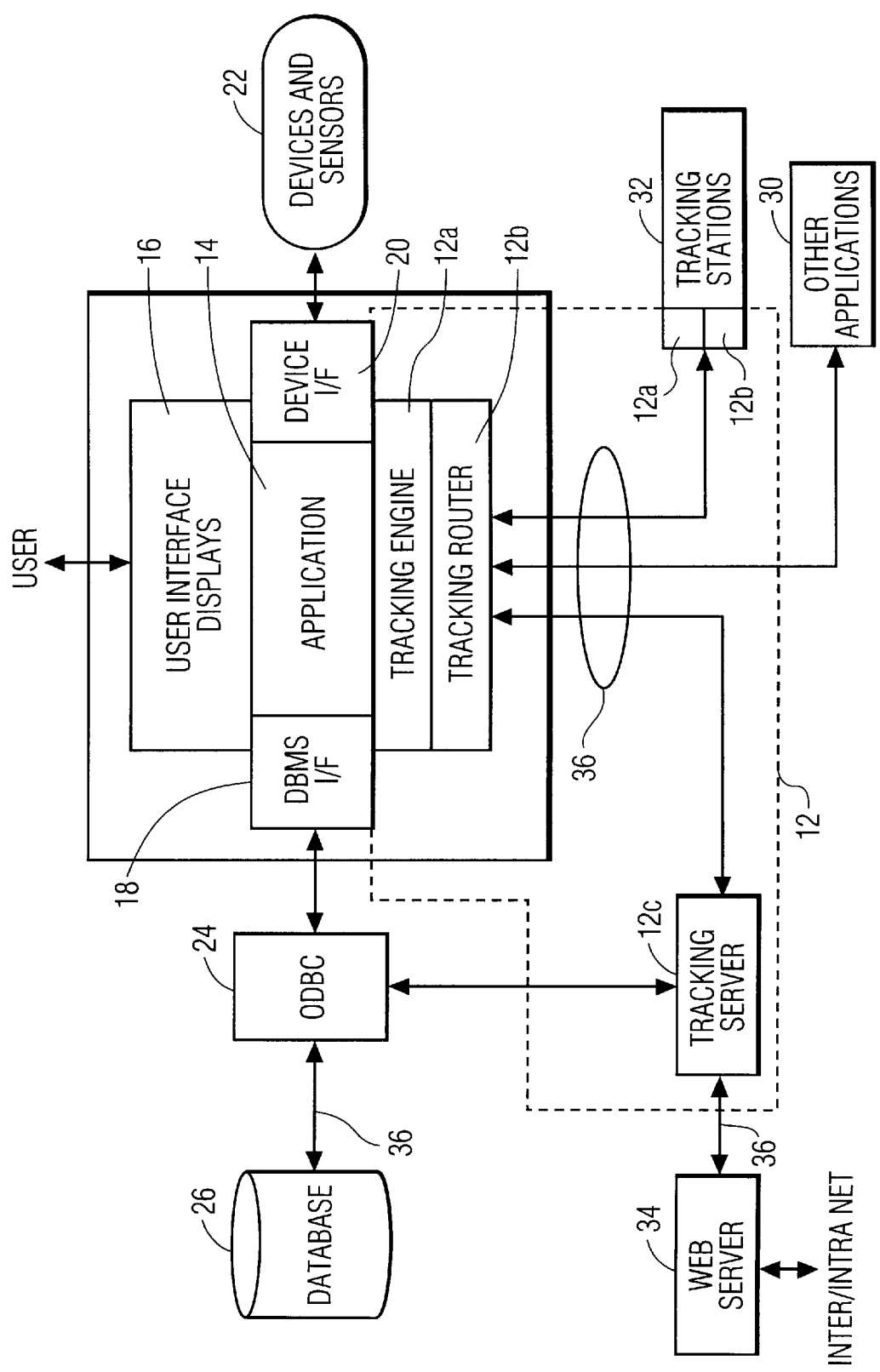
FIG. 1 is a block diagram showing the overall architecture for a system incorporating a tracking engine according to a preferred embodiment of the invention.

The object tracking engine according to the present invention provides common representation and operations across all tracking domains. In particular it provides a layered set of definitions and operations which extend the core tracking engine capabilities. The engine communicates with a tracking server which coordinates the distributed tracking application with other system enabled applications. The core concept behind the development of the tracking engine is that it provides a core representation of the tracking domain which can be easily applied to new tracking applications with minimal development of new software.

A key aspect of the system for achieving the foregoing result is a universal abstraction of the tracking domain. The essential objects within any tracking application have been abstracted away from the industry-specific application and defined in an object-oriented design specification. This enables the engine to provide a base on which any other tracking application may be developed rapidly by simply filling in the specifications of the domain's objects.

The abstraction of the tracking domain can be achieved with the following objects:

1) a "tracked entity", representing any entity which is tracked through one or more processes or one or more locations;

2) a "location", representing a physical place where a tracked entity is operated upon or the presence of the entity is logged;

3) a "process" which is a description of one or more operations which collect information regarding an entity or modify the entity;

4) a "flow" which defines an ordered set of processes which describe an end-to-end flow of an entity through a business scenario; and 5) a "domain" which is a high-level description of the collection of tracked entities, locations, processes, and flows which fully describe a set of business operations.

These objects, which collectively form the tracking engine 12 shall hereinafter be discussed in greater detail.

A tracked entity is any object which is to be tracked through a set of processes (a flow) and locations. The tracked entity has a set of default properties which form the basis of a tracking engine enabled application in accordance with a preferred embodiment of the invention. For example, in an airport passenger or baggage tracking application, tracked entities would be passengers or passenger bags. Each of the tracked entities has a set of properties which uniquely identify and describe the entity. For example, passengers have a unique identification number assigned and properties such as last and first name, telephone, emergency contact and other information.

A location is a node or workstation at which one or more processes may be performed. For example, in an airport passenger and baggage tracking system, locations would include the Main Ticket Counter, Gate Counter, Boarding Gate/Jetway, and Baggage Loading Area. Each of the above areas would typically have one or more workstations. Each workstation is defined to be in one of the above logical locations and is defined to be authorized to perform one or more processes.

A process is some operation performed upon a tracked entity. The process may collect information about the tracked entity, modify existing information on a tracked entity, or perform some other operation. The process is performed at one or more of the designated locations. In the airport passenger and baggage application discussed above, processes might include: Passenger Check In, Baggage Loading and Passenger Boarding.

A flow is an ordered collection of processes which, taken together, form an end-to-end set of transformations on the tracked entity being operated upon. The flow object describes the flow, and identifies the set of process instances which comprise the flow. In the airport passenger and baggage example described above, the flows would typically include Passenger Processing and Baggage Processing.

A domain is the collection of tracked entities, locations, processes, and flows which, together, comprise a complete description of the business process modeling.

FIG. 1 is a block diagram showing a tracking engine architecture in accordance with a preferred embodiment of the present invention. As shown therein, the tracking system is comprised of an object tracking engine 12a, an object tracking router 12b and a tracking server 12c, which together comprise a distributed object tracking engine 12. The tracking system is further comprised of application code 14, user interface and displays 16, DBMS Interface ("DBMS I/F") 18 and device interface ("device I/F") 20. OBDC standard drivers 24 are provided for permitting the system to interface with a database 26. The device I/F includes drivers and code for devices and sensors 22. The tracking engine 12a communicates through the tracking router 12b and the tracking server 12c which coordinates the distributed application with other system-enabled applications. The database 26 is preferably any one of several commercially available database application programs such as the Oracle database system.

The tracking router 12b preferably communicates with the tracking server 12c, remote tracking stations 32, and other applications 30 via a computer network 36. Each tracking station 32 preferably is arranged similarly to the tracking system and has a tracking engine 12a process and tracking router 12b process executing on the station. However, only one of the stations, or a separate machine, will be executing the tracking server 12c. In the case where the server 12c is executing on a separate machine, it will be appreciated that a computer network would be used to link the server 12c and the router 12b in FIG. 1.

Figure 2:
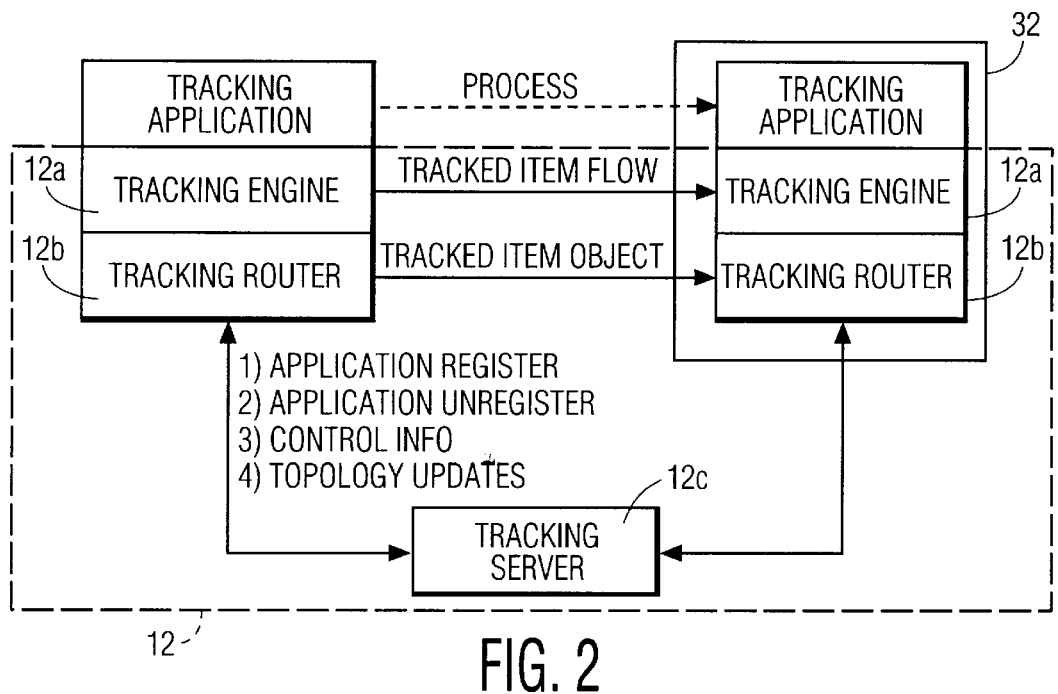
FIG. 2 is a block diagram showing the architecture of the tracking engine of FIG. 1.

Referring now to FIG. 2 it can be seen that there are three functional components of the tracking system 12, namely the tracking engine 12a, tracking router 12b and tracking server 12c. Each PC or workstation running an application built upon the distributed tracking system has a tracking engine 12a process and a tracking router 12b process executing on the station. In addition, one of the stations or a separate machine will be executing the tracking server 12c. The manner by which these components are integrated with a tracking application and each other is illustrated in FIG. 2.

In FIG. 2, the server 12c provides a registry of network and process topologies, known domains, network locations and the processes performed at each location. The router 12b provides the interface between the application and the server 12c. The router 12b also provides the direct routing of tracked entity information to the next process and/or location defined in the flow. The tracking engine 12a provides the interface between the tracking application and abstracts the domain specific tracking data to a set of generic tracking objects as shall hereinafter be explained in further detail.

The tracking server 12c is the repository of tracking domain information. It provides one or more tracking routers 12b, each associated with a respective tracking application, with initialization information as they start up. The tracking server 12c also provides the routers 12b with updated information regarding the process flow topology as routers shutdown, and provides a centralized mechanism for notifications and application registration.

The tracking server 12c is configured to support multiple domains concurrently. Thus, a single server 12c may be supporting a package routing and tracking application 10 while concurrently supporting an employee access application 30. Multiple domains may be supported because of the domain abstraction provided by the tracking system 12. While vastly different applications may be tracking and forwarding different information, the basic concept of tracked entities, processes, and locations does not change. Consequently, the tracking system 12 supports the routing and flow of information the same way, regardless of the content of information.

The basic operations and communications of the components 12a, 12b and 12c of the distributed tracking system are server initialization, router initialization and application registration. Server initialization is performed as the server starts up. It prepares the server 12c to manage a distributed tracking application and broadcasts it's availability across the network. Router initialization is performed as the tracking router 12b is started and initializes to handle message routing between components. The router 12b notifies the server 12c of its presence. Application registration occurs after a router 12b has been initialized. The router 12b accepts registrations from applications which intend to use the routing system. The registration process is conducted between the application 14 and the router 12b with the router notifying the server of any application registrations.

To summarize then, the tracking engine 12a and router 12b provide the interface between a particular tracking application 14 and the data modeling and distribution provided by tracking server 12c. The router 12b automatically attempts to register itself with the server 12c upon startup. This notifies the server 12c that a network node has been added to the distributed tracking application and thereby updates the set of known locations.

Once a router 12b has been registered with the server 12c, the application 14 may then register with the server 12c. The registration of the application 14 identifies the domain to which the application belongs. The application 14 also registers the processes that can be performed on the node.

As for the remaining components and the operations performed in FIG. 1, the database connection is preferably implemented using the Microsoft Open Database Connection (ODBC) standard, which standard is well known to those familiar with database applications. This enables the tracking system 12 to use other database engines without any modification to the core application code 14. Suitable drivers and interface Device I/F 20 permits the application 14 to communicate with devices and sensors 22 as needed to support the application. Typically, these device drivers are provided by the manufacturer of the device or sensor to be integrated with the application. For example, in tracking passengers and baggage through an airport sensors applied to this tracking application include Bar Code readers, Radio Frequency (RF) Tag readers, active RF tag reader/writers, magnetic stripe readers, and others.

Figure 3:
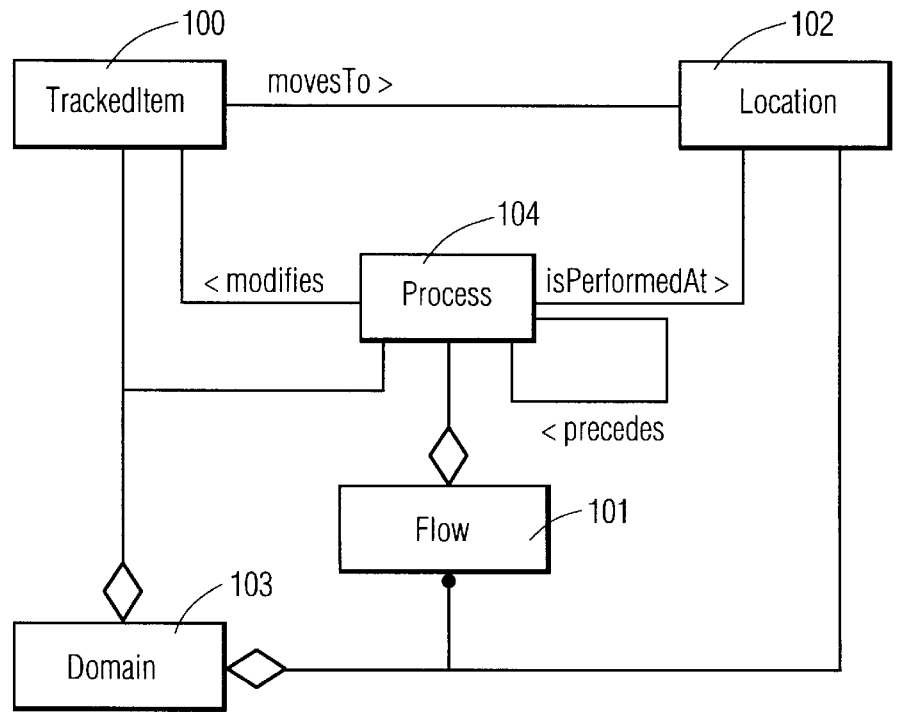
FIG. 3 is a diagram showing the relationships between the core objects in the tracking engine.

FIG. 3 shows the relationships between the core classes of objects in the tracking system using Rumbaugh Object Modeling Technique (OMT). This object modeling technique is well known to those skilled in the art and is discussed more fully in the textbook Object Modeling by Rumbaugh et al and Uniform Modeling Language (UML) guide by Rumbaugh, Booch, and Jacobsen. The OMT diagram shows the concept of a tracking domain which is formally described by a set of object classes defining Tracked Items 100, Locations 102, Processes 104 and Flows 101. Together, these objects comprise a Domain 103. The interpretation of the associations between the objects is as follows: A line between two objects represents a relationship between those objects. The line may have one of several endpoints. A line with no additional endpoint represents a single instance of that object. A line with a hollow circle represents zero or one instance of the object. A line with a filled circle represents zero or more instances of the object.

In FIG. 3, the Flow object class 101 is an ordered collection of processes which define a particular flow. Each process has three primary associations. A Process 104 modifies one or more instances of a Tracked Item 100 as part of the process' operations on the entity. An instance of Process 104 is performed at one or more Location objects 102. Finally, a process may be followed by another process. This linking of processes in an ordered fashion provides a description of the ordered processes which comprise a flow. It should be noted that a process may operate on more than one tracked entity and may be performed at more than one location.

Figure 4:
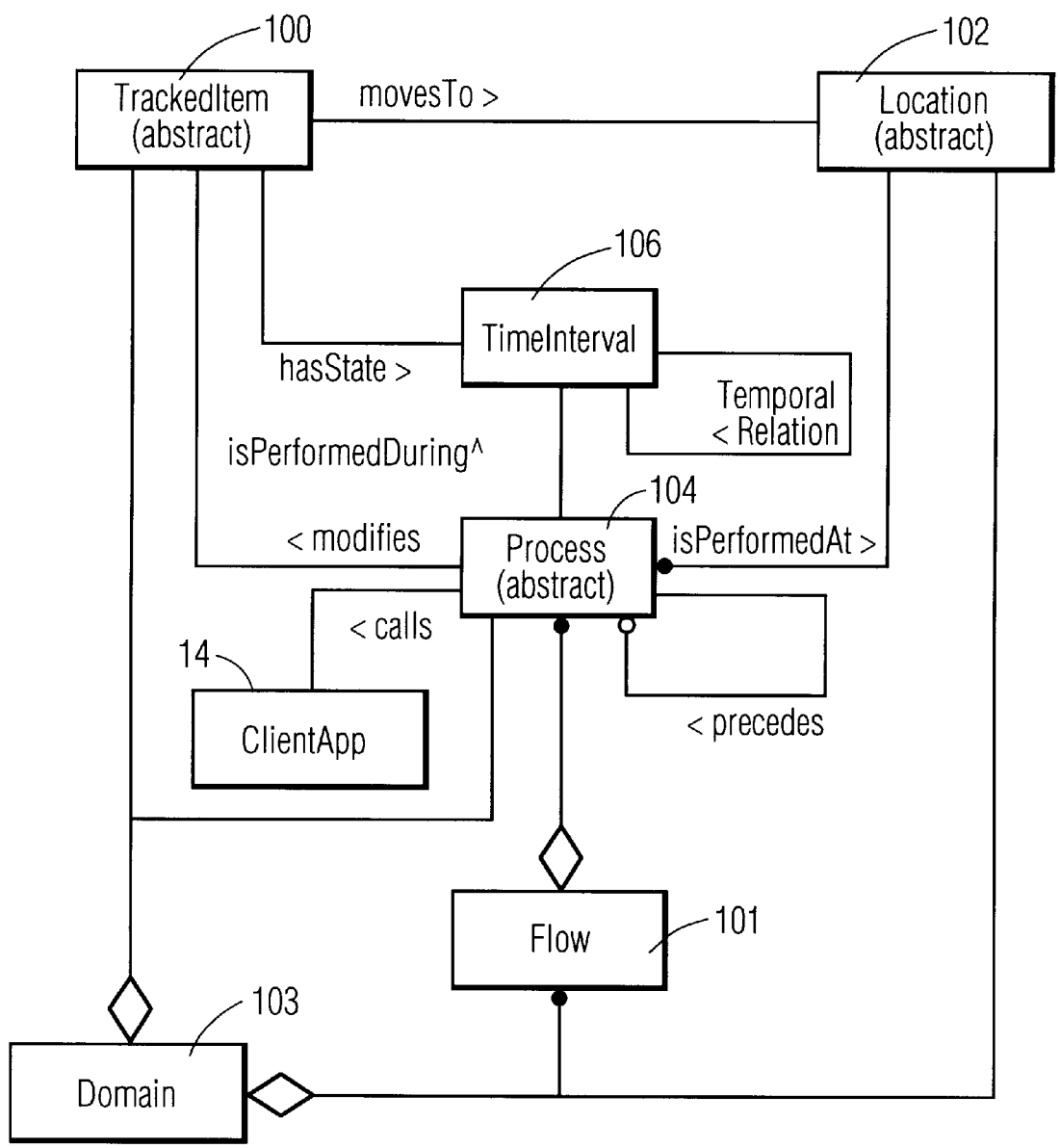
FIG. 4 is a top level object model for the tracking engine according to the invention.

The core components of the tracking system are shown in greater detail in FIG. 4. These core components include the TrackedItem class 100, Location class 102, and Process class 104. These are abstract object classes because within the tracking engine implementation, they are defined to handle the generic operations and data values for a tracking and control application. Thus, it will be readily appreciated that part of the insertion of the tracking engine into an application domain is the specification of specialized classes of TrackedItems 100, Processes 102, and Locations 104. For example, an implementation for college student registration might have the Student as a specialized instance of TrackedItem class 100. The Registrar, Cashier, and Bookstore might be specific classes of Location class 102. Pay Tuition, Submit Class Request, and Purchase Books might be specific classes of the Process class 104. For the above processes, it is possible they may be performed in multiple locations with each location being an instance of one of the Location classes defined. Each student becomes an instance of the Student Class.

A Process is performed at a Location and modifies a TrackedItem. These relationships provide both the link to a particular tracked item as it is being acted upon at a particular location, and also generically identifies where a process may be performed. Thus, when a tracked item is ready to be processed, the system may identify alternate locations for that process to be performed if a specific location is unavailable or overloaded. Thus, the tracking engine model according to the present invention also provides opportunity for load balancing processes within an overall system.

Each TrackedItem has a relationship with a location. This is updated as the item moves through the defined flow. Thus, each tracked item can be queried as to its current location within the business flow and the current process interacting with the item. Further, because the state of an item changes with time, a tracked item's state is preferably maintained in a temporal ordered list using time intervals. In FIG. 4, this is represented by a TimeInterval object 106. A time interval is a duration of time which may have discrete time points for its start and end. The time interval also has a duration. The duration may be computed from discrete time points, if available, or may be simply a magnitude value representing the estimate of time. Each interval has relationships to other intervals within the tracking engine, thereby forming an ordered temporal system.

In addition to maintaining temporal state information for tracked items, the Time Interval object 106 is also used to provide information regarding the execution of a process within a time frame. Thus, the temporal system can be viewed as a matrix of interval relationships with each interval linked to a process or state information. These time intervals can represent completed, ongoing, and future processes or states. Thus, the tracking system 12 provides the ability to not only monitor current state, but also past activities that have been completed, and to project forward temporally. This temporal projection ability can be used for a variety of useful purposes. For example, it can be applied to the prediction of resource conflicts at a particular location, and can be used to experiment with different scheduling scenarios.

The Process object 104 represents the state modifications performed on a particular instance of a TrackedItem which occurs at a given location. Thus, the Process object 104 provides the interface between the tracking engine 12a and the application 14 using the tracking engine. The application 14 registers with the engine 12a and registers callback functions to be invoked when predefined engine events, such as arrival of an item. Each process has information regarding the ordering of the processes within a specific flow. These processes may hand off the item to the next process, if on the same machine, or forward it to another machine following routing tables provided by the tracking server 12c.

To restate the relationships and interactions between the core components shown in FIG. 4:

A Domain 103 is any tracking application that is specific to a particular industry, company, or organizational entity. Each specific domain is represented as an instance of the domain class. Each domain, so specified, is comprised of several components which define the domain in detail. These are the TrackedItem 100 class, the Flow 101 class, the Location 102 class, the Process 104 class, the TemporalInterval 106 class, and the ClientApp 14. Thus, for a given domain, there may be multiple business flows defined. These are represented within the engine as multiple instances of the Flow 101 class.

Within each instance of the Flow 101 class, there may be multiple instances of the Process 104 class. Each instance of the Process 104 class represents a specific, atomic process that is performed as part of the flow. Each Process 104 has a relationship which defines the TrackedItem 100 instances on which it operates. Thus, each Process 104 maintains a relationship with each TrackedItem 100 it modifies.

Each Process 104 also maintains a relationship with each Location 102 defining where the process is to be performed.

Thus, a Process 104 can be queried to identify TrackedItem 100 instances on which it operates and the Location 102 instances where it performs the operations. Each Process 104 also maintains a relationships with other Process 104 instances that logically follow. This ordered collection of processes can be represented mathematically as a directed graph (DG). Each DG of Process 104 definitions, together with the relationships to TrackedItem 100 and Location 102 forms the core representation of a Flow 101.

Associated with each Process 104 is a TimeInterval 106. The TimeInterval 106 provides a representation of the time over which a process is performed. Each TimeInterval 106 may have a discrete start and end point. Also, the TimeInterval 106 may simply be represented as an estimated duration by simply using a magnitude.

Each TimeInterval 106 has a TemporalRelationship 106 to the other TimeInterval instances for a given flow. This set of relationships between TimeInterval 106 instances forms a complete Temporal System which describes the ordered flow, including time.

Finally, a Process 104 may invoke a ClientApp 14 via a callback or event. This enables the engine to be applied to be customized for unique domains requiring interaction with end-user processes.

Figure 5:
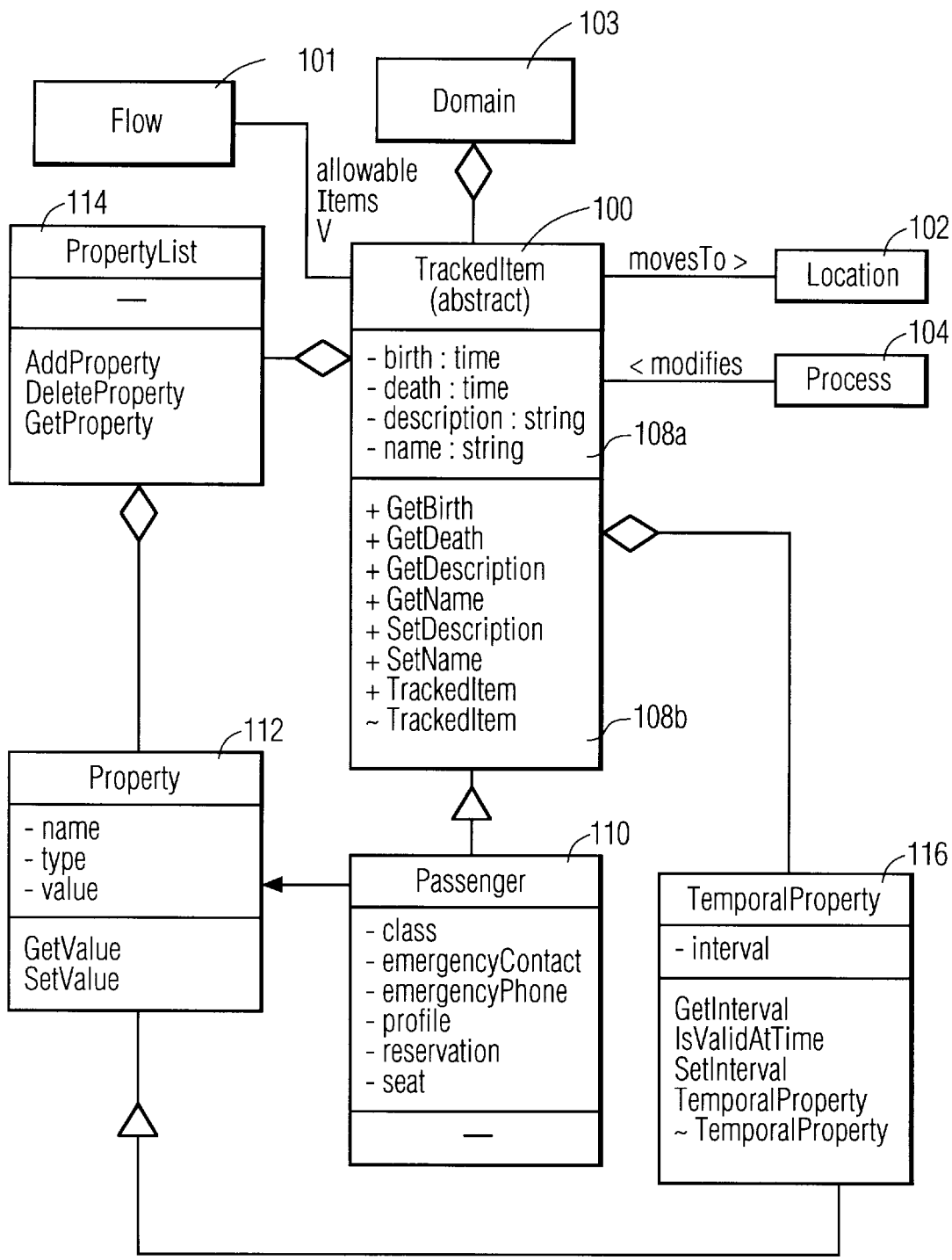
FIG. 5 is a detail object model for the tracked item object in FIG. 3.

FIG. 5 shows the detail specific object model for the TrackedItem class 100. The TrackedItem class 100 is an abstract template which must be capable of being extended to apply the engine to a given domain. FIG. 5 shows the common properties of the TrackedItem class 100 extended for particular tracked item, namely a Passenger, within the airport passenger and baggage tracking example previously discussed. As shown therein, each tracked item maintains an internal data structure 108a. The TrackedItem Properties 108a describe the data items that are stored and maintained internally for each TrackedItem. As shown in FIG. 5, TrackedItem Properties 108a include birth, death, description and name. The first two are a data type called time and the latter two are string data types. In addition, the minus sign (or dash) preceding the property or method name indicates that it is a private property and not visible outside of the object. The operations provided by the tracked item are shown in FIG. 5 reference number 108b.

TrackedItems are extended using a PropertyList which maintains an extensible set of properties for each tracked item class. As shown in FIG. 5, the Passenger class 110 is shown as a subclass of the TrackedItem class 100. Thus, it will be appreciated that the relationship vector between the Passenger and the Property class 1 12 in FIG. 5 represents the instantiation of Property for each of the data items shown on the Passenger class.

The object model of FIG. 5 also illustrates the temporal tracking of property values. The PropertyList 114 for a particular instance or tracked item in TrackedItem class 100 maintains the current set of values. As a property changes value, an instance of TemporalProperty class 116 is created to maintain the previous value. TemporalProperty instances may also be created to maintain a prediction of future states or values. Thus, the TemporalProperty class object 116 enables the tracking engine 12a to maintain a full temporal history as well as projection of values for a particular tracked item's properties. The TemporalProperty class 116 is a subclass of the Property class because it inherits all the functionality of the Property class, but adds the ability to maintain a reference to a temporal interval and time-based access functions.

Figure 6:
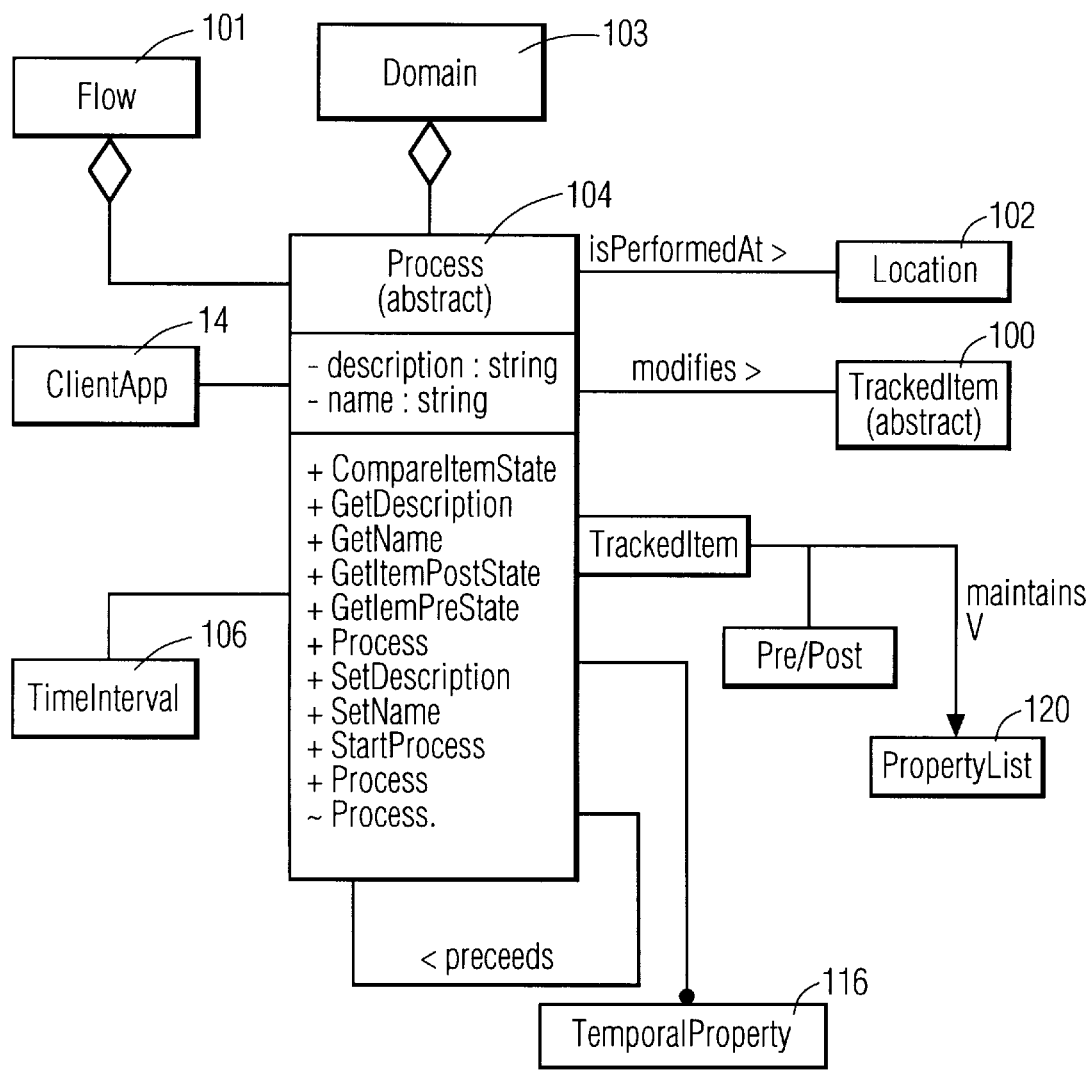
FIG. 6 is a detail object model for the process object in FIG. 3.

FIG. 6 is a detailed model of the Process object class 104. Process class 104 describes each process that changes a tracked item as it moves through the business flow. The Process object provides the link between the client application code 14 which using the tracking engine 12a and the remainder of the tracking system. As shown in FIG. 6, the Process 104 object has two essential properties, a description and a name, both strings. It has several methods (functions) which perform actions based on the particular state of the process instance. A summary of these actions follows:

CompareItemState—This method will compare the internal state of the object's properties against the pre/post state expected. It will return true if the current internal state matches the expected state.

GetDescription—Returns the description property

GetName—Returns the name property.

GetitemPostState—Returns the property list containing the specification of property values expected upon completion of the process for a given TrackedItem 100.

GetItemPreState—Returns the property list containing the specification of property values expected prior to initiation of the process for a given TrackedItem 100.

Process—Instantiates the Process 104 for a specific domain.

SetDescription—Takes a string argument and sets the internal description property to the value provided.

SetName—Takes a string argument and sets the internal name property to the value provided.

StartProcess—This method initiates the processing of a TrackedItem 100. It uses the GetitemPreState and GetitemPostState methods and provides the mechanism to issue a callback into the ClientApp 14.

As will be appreciated from FIG. 6, a key concept of the definition of a process is the specification of the pre-and post-property values. Each instance of Process object 104 maintains a pre-and post-PropertyList 120 for each TrackedItem on which it can operate. The pre-process PropertyList for a given TrackedItem describes the expected or required state of an item to be modified by the process. Part of the process function is to verify that the tracked item is in the correct state prior to initiating any modification to the item's state by the application. If the object is in the proper state, the client application 14 is notified as shown in FIG. 6, and the TrackedItem object is passed to the client application for processing.

When the client application has completed with the item, it notifies the particular instance of the Process object 104 and passes the object back to the process. The process then compares the state of the object returned from the client application 14 against the expected state as defined in the post-process PropertyList 120. If the changes made agree with the expected states, the process 104 notifies the local tracking router 12b that it has completed operating on the item, and it is available for routing to the next process defined in the flow.

Since each process maintains precedence relationships with subsequent processes within the flow, it provides the router 12b with the identification of the next process. This enables a faster routing of the object to the next application 14, rather than requiring the router 12b to request from the Flow object 101 information for subsequent processes for each process in the Flow.

Figure 7:
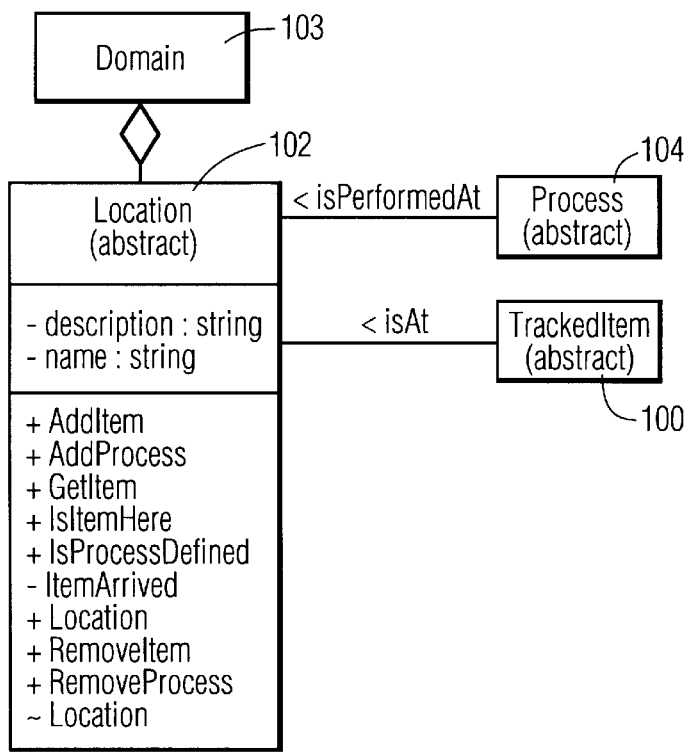
FIG. 7 is a detail object model for the location object in FIG. 3.

The Process 104 also has a TemporalProperty 116 which maintains a set of values describing the process state within a specific temporal interval. This object provides the mapping between the general definition provided in Process 104 and the TimeInterval 106. Thus, for each TimeInterval 106 associated with a Process 104, there is a corresponding TemporalProperty 116 which maintains the state information for the process during the specific temporal interval. As each process performs its activities upon the item, it updates the temporal interval associated with the process to reflect the actual transition of the item through the process. This is reflected also in the installation of a TemporalProperty to maintain the state history of the process. FIG. 7 is a detailed object model for the Location type class of objects 102. As shown in FIG. 7, each location where a process may be performed, and to which an item may be routed, is represented as an instance of a Location class object 102. The primary information provided by the Location object 102 is the mapping of processes to places where they are performed and tracked items to places through which they transition. Thus, it provides a mapping of the logical or physical flow of the item through set of processes.

Each instance of Location 102 maintains information regarding the processes, Process 104, performed at the location and the tracked items, TrackedItem 100, currently at the location. It has several methods which provide the interface to maintain this information. The following describes the methods shown.

AddItem—Adds a TrackedItem 100 to the list of tracked items currently at the location.

AddProcess—Adds a Process 104 to the set of defined processes defined for a location.

GetItem—Given a TrackedItem 100 key or identifier, this method returns the instance of the tracked item for processing.

IsItemHere—Given a TrackedItem 100 key or identifier, this method returns true if the tracked item is currently in the list of tracked items added to this location (reference Additem). Otherwise, it returns false.

IsProcessDefined—Given a Process 104 key or identifier, this method returns true if the process is in the list of processes added to this location (reference AddProcess). Otherwise, it returns false.

ItemArrived—This method is internal to the Location 102 and is called when a TrackedItem 100 arrives at the location for processing.

RemoveItem—This method removes a specified TrackedItem 100 from the list of tracked items currently at the location.

RemoveProcess—This method removes a specified Process 104 from the list of processes defined for the current location.

Figure 8:
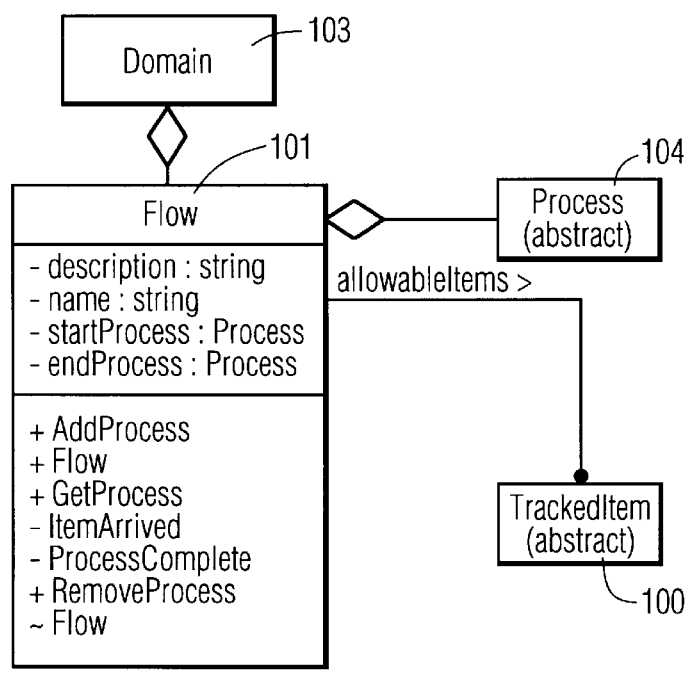
FIG. 8 is a detail object model for the flow object in FIG. 3.

FIG. 8 is a detailed object model for the Flow class of objects 101. As previously noted, a flow is an ordered collection of processes within a domain. Each flow describes a specific business process which operates on one or more tracked items, and is performed at one or more locations. According to a preferred embodiment of the present invention, a primary function of the Flow object 101 is to initiate the processing of an object within the tracking engine 12. While each instance of a Process object 104 maintains an ordered vector to the subsequent processes defined, the Process object 104 has no indication or state information which identifies it as an initial or final state of the business process flow. Instead, this information is maintained on by the Flow object. Each instance of a Flow object has the initial (startprocess) and final (endprocess) process for the flow. Thus, as an tracked item is created and inserted into the tracking engine, the router notifies the selected flow of the object's creation/arrival. Upon receipt of the notification event, the particular instance of Flow object 101 will activate the first process defined in the flow, and route the object to the process. Once initiated, the Process object 104 will route the item to the subsequent processes, as specified in the Process object.

When a tracked item has reached the last process defined for a particular flow, the process will be unable to route the item further, since there will be no subsequent processes defined for the process. The process then notifies the flow that it has no forwarding process information for the item defined, and hands over control back to the particular instance of Flow object 101. The Flow instance will then perform any cleanup necessary for the completed Flow, and forward that information to the server. The tracked item is then terminated signifying it has completed the assigned flow.

Each instance of a Flow 101 maintains a collection of Process 104 objects which describe the business flow. In addition to the normal name and description properties, the Flow 101 also maintains to properties, startProcess and endProcess, which contain references to the first Process 104 and last Process 104 in the flow. In addition, it has several methods which provide the interface to maintain state information. These are:

AddProcess—This method adds a Process 104 to the collection of processes defined to be part of the Flow 101.

GetProcess—Given a Process 104 key or identifier, the Flow 101 can retrieve a specific process for operation.

ItemArrived—This is an internal method that is called by the Tracking Router 12*b* when a TrackedItem 100 arrives at a particular node for processing.

ProcessComplete—This internal method is called when the TrackedItem 100 has completed its traversal of the Flow 100. It initiates any cleanup and finalization process necessary.

Remove Process—This method removes a specified Process 104 from the list of processes defined for the Flow 101.

Figure 9:
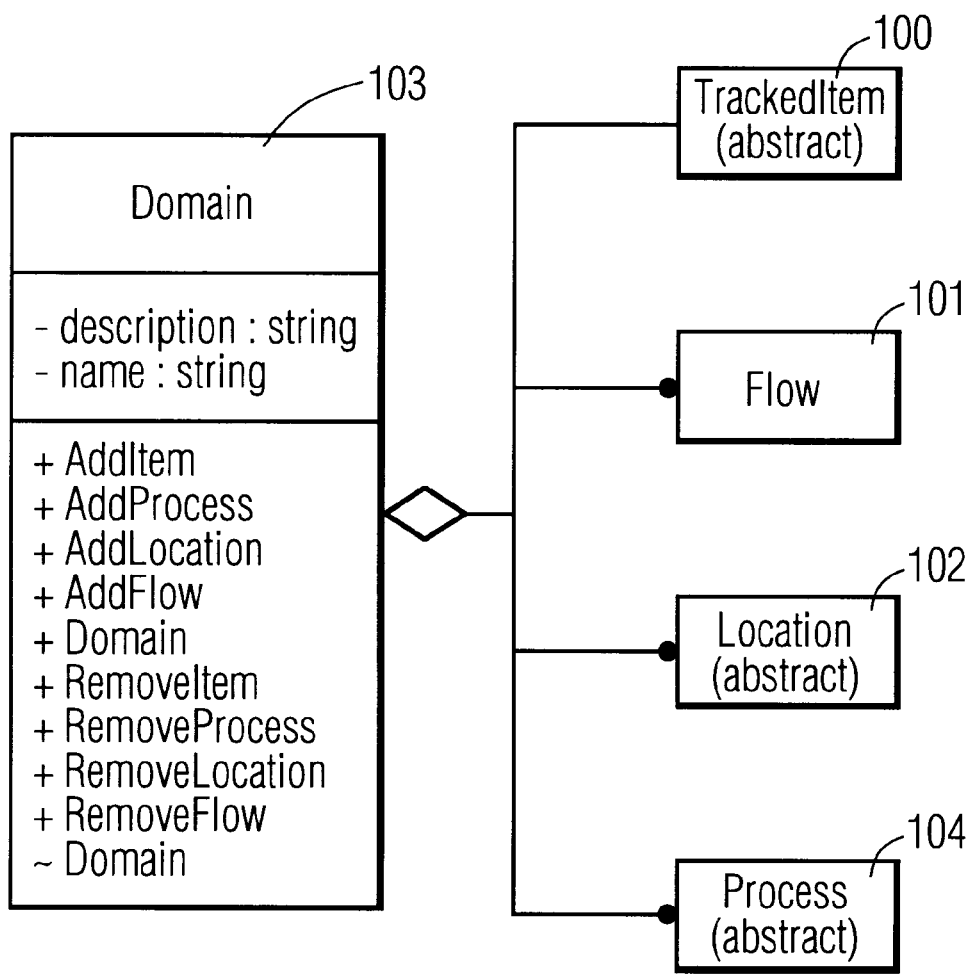
FIG. 9 is a detail object model for the domain object in FIG. 3.

FIG. 9 is a detailed object model for the Domain object class 103. The Domain class object is primarily an administrative object which helps to organize the collection of Processes 104, TrackedItems 100, Locations 102, and other objects which comprise a specific domain. The Domain 103 manages the set of TrackedItem 100, Flow 101, Location 102, and Process 104, objects that comprise a business domain. These are maintained by the Domain 103 through the methods provided. These are:

AddItem—Adds a TrackedItem 100 to the current list of tracked items for the domain.

AddProcess—Adds a Process 104 to the current list of processes for the domain.

AddFlow—Adds a Flow 101 to the current list of flows for the domain.

AddLocation—Adds a Location 102 to the current list of locations for the domain.

RemoveItem—Removes a TrackedItem 100 from the current list of tracked items for the domain.

RemoveProcess—Removes a Process 104 from the current list of processes for the domain.

RemoveFlow—Removes a Flow 101 from the current list of flows for the domain.

RemoveLocation—Removes a Location 102 from the current list of locations for the domain.

Figure 10:
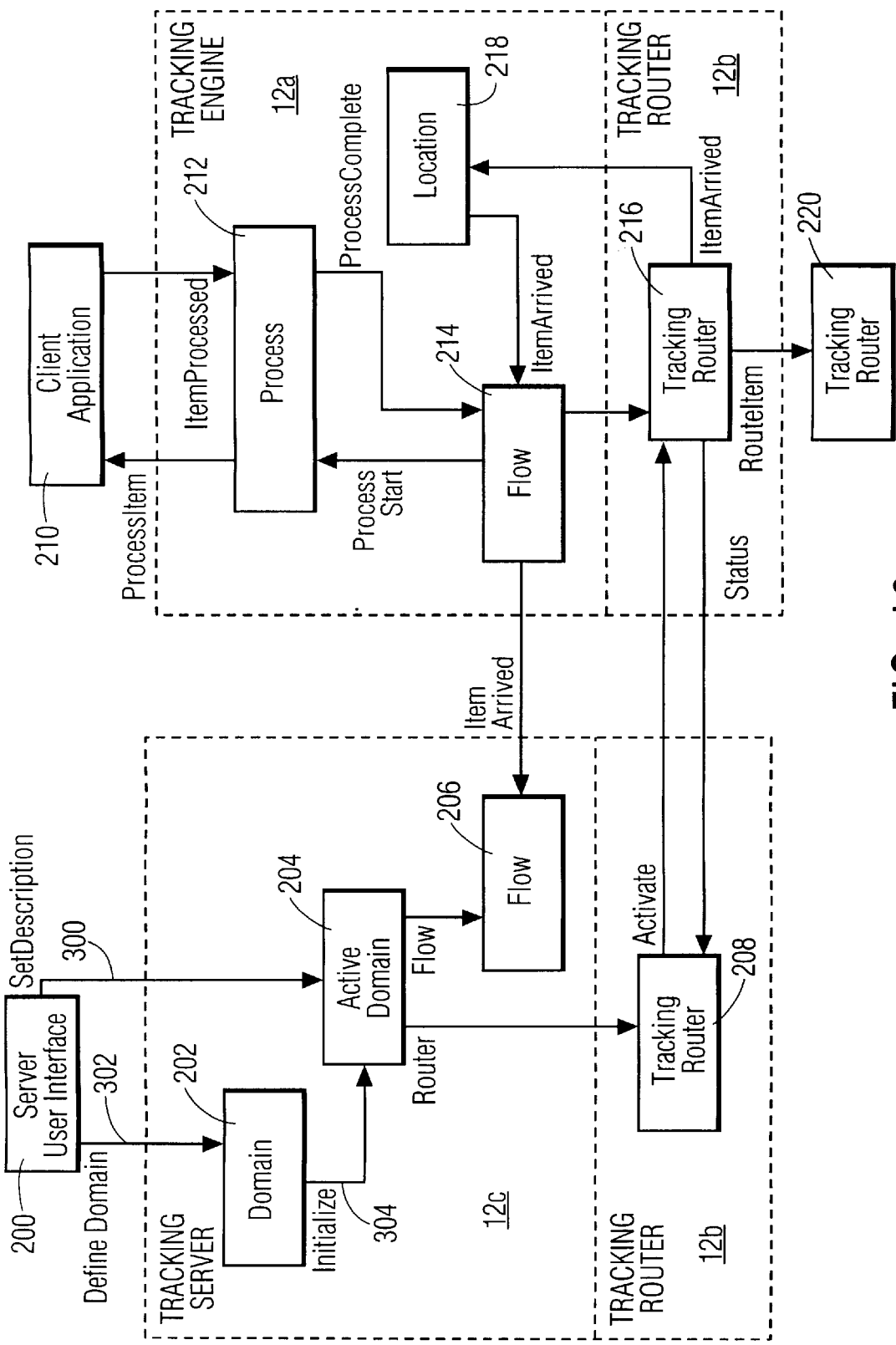
FIG. 10 is a collaboration diagram for the system of FIG. 1 showing the interaction between the objects which comprise the distributed tracking engine.

FIG. 10 is a collaboration diagram showing the interaction between the objects which comprise the tracking system 12 and the processes which implement the distributed engine. The key set of process collaborations occurs between the tracking engine 12a, the local tracking router 12b and tracking server 12c. This is illustrated in FIG. 10.

As shown in FIG. 10, the distributed tracking engine 12a, b, and c is started for an application site. The user creates a new domain using the server user interface 200. This occurs through a call 302 to the constructor 202 of the Domain class 103 to create a new domain instance for the domain to be tracked. This results in a new instance of the domain specified. At this point, the user may define tracked items, processes, flows and locations. When a domain is activated the domain is initiated and becomes the active domain 204. The active domain instance 204 is caused to initialize by call 304, and activates the tracking router process 208 on the server side of the interface.

As a process is defined, the interface screen 200 is used to update, create, and remove components and items which comprise a given domain. This is shown by item 300 SetDescription, to the ActiveDomain object 204.

The server side router (Tracking Router) 208 activates any client routers 216 (Tracking Router) required for a given domain or flow within the domain. Each client router 216 provides the server router 208 with periodic state information. This enables the server router 208 to maintain a table of all the client routers 216, their states, and provide restart or failover between nodes.

When an item is instantiated or arrives at a client router 216, the local router notifies the location object 218 for that node that an item has arrived. The location object 218 for the node identifies which flow the item is currently following, and forwards it to the flow object 214 on the local node. The flow object 214, in turn, notifies the flow object 206 on the server side that it is about to begin processing the item. This enables the server 12c to maintain a supervisory view of the activities ongoing at each of the nodes. The flow object 214 then identifies the process to be performed on the item and forwards the item to the process object 212.

The process object 212 checks the pre-process property values defined for the specific item type, and then invokes the application callback. This call is to the local application 14 on the workstation where the client tracking router 216 resides. The client application 210 operates upon the object and then returns it to the process 212 when it is completed.

The process 212 verifies the post-process property list against the values for the item. The process 212 notifies the flow 214 that the object has been processed and the next process to which it should be routed. The flow 214 then calls the client router 216 to route the item to the next process specified. See FIG. 2. The router 216 takes the object and forwards it to the client router 220 specified. Once forwarded, the local copy of the object is removed from the client application. State history and property information is updated and forwarded to the server 12c for storage and archiving.

It will be readily appreciated that a natural extension to the tracking engine as disclosed herein is to web-enable the tracking server. This would provide the capability for any user interested in viewing status information about the entities being tracked to access that information via the World Wide Web. Thus, in FIG. 1 a web server 34 can optionally provided to facilitate a web-enabled tracking application according to a preferred embodiment. As previously explained, the tracking server 12c maintains state information within the relational database. This information, is preferably used in conjunction with an Internet Information Server (IIS) application installed on the web server 34 for hosting the tracking server 12c and thereby providing web access to the system. Thus configured, the user may query the database or monitor a particular entity, location, or process, with world-wide access to information critical to the operation of their business.

As discussed relative to FIG. 1, the user application interface displays 16 provide a common framework for implementing tracking and control applications. The main form is implemented as a Multiple Document Interface (MDI) interface. This enables the logical extension of the tracking engine 12 for a specific domain to be implemented visually by specifying a client window for the particular application domain. Thus, for the airport tracking application, the client screens might consist of Check In, Baggage Handling, and Boarding as the primary operational screens. Other applications, such as asset tracking for parts may only require a single screen.

Figure 11:
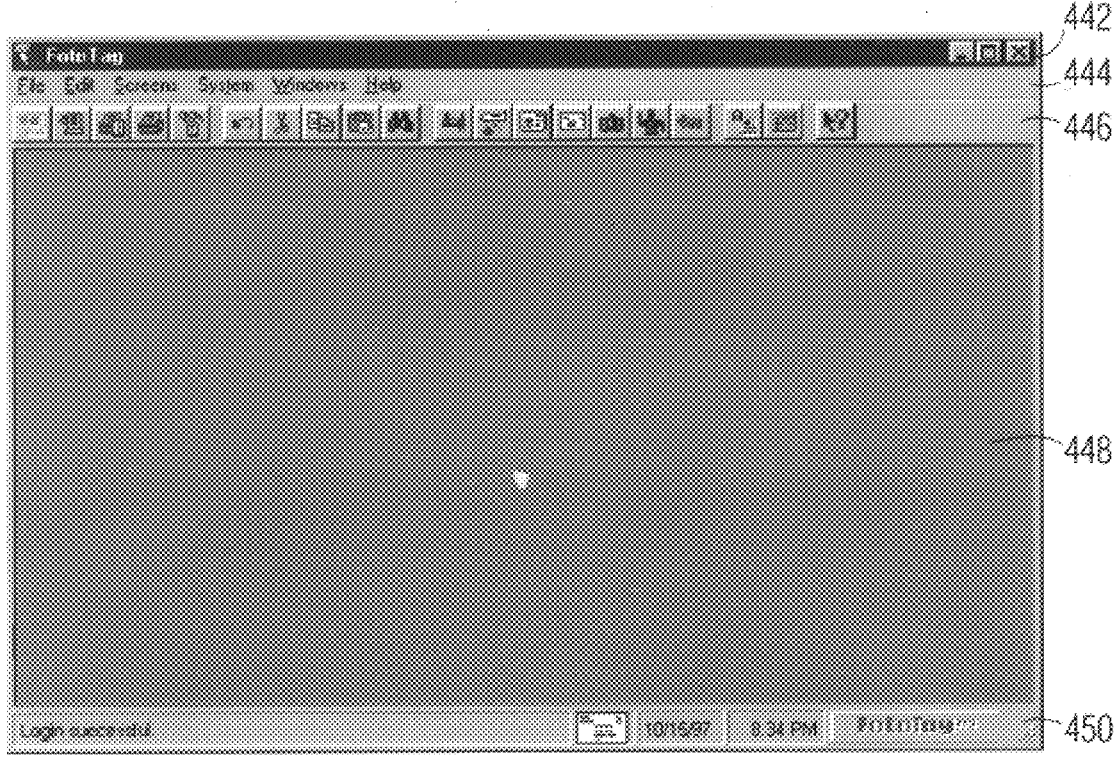
FIG. 11 is a main screen graphical user interface screen display for a tracking system according to a preferred embodiment of the invention.

The main user interface screen is shown below in FIG. 11. The main screen consists of five primary areas. The title bar 442 shows the current client screen, when one is present. It also has buttons for exiting the application, minimizing, and maximizing the window. The menu bar 444 provides a set of pull-down menus which provide access to screens or functions performed by the application. The tool bar 446 provides a shortcut to access screens or perform functions available through the menus. The client area 448 is an open area of the main screen in which application-specific windows are presented. These windows display information or are used for data entry for a particular tracking application. The status line 450 is a multi-pane window at the bottom of the main screen. It provides information regarding the application, task progress, date, time, notification of message arrival, and other status information.

Figure 12:
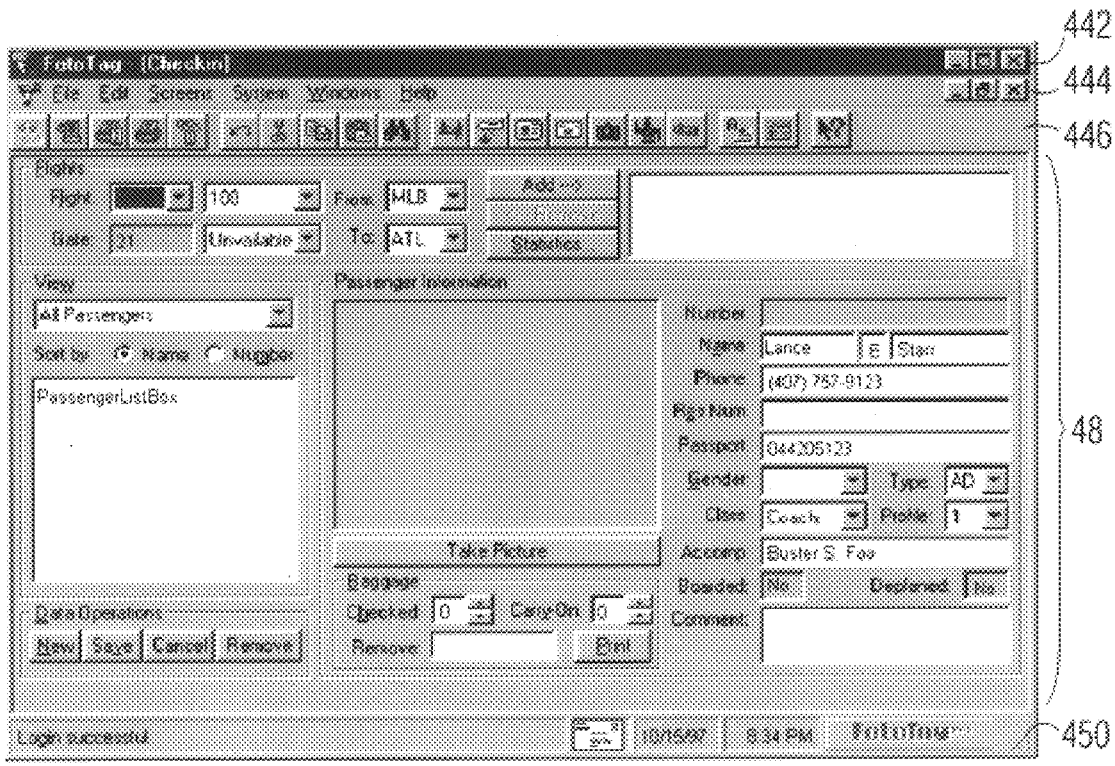
FIG. 12 is an example of a graphical user interface screen display for use with the invention as applied to an airport passenger and baggage tracking application.

The client area 448 hosts the application specific tracking and control forms. This area is discussed in more detail below. FIG. 12 shows the client area form for the airport tracking application previously discussed. In the airport application, there are several screens with each screen corresponding to a particular function or process to be performed by airport or airline personnel. The function shown in FIG. 12 is the Passenger Check In screen.

Figure 13:
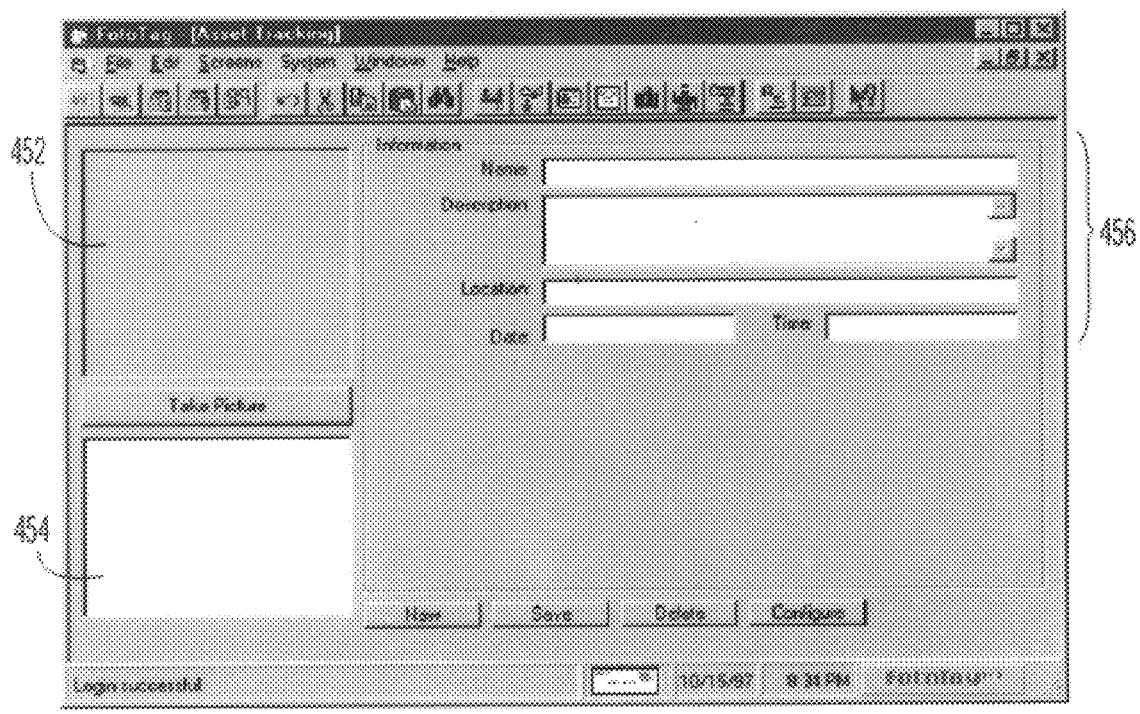
FIG. 13 is a generic graphical user interface screen display for use with the invention to facilitate dynamic tracking form generation.

An important capability for ensuring that a tracking application will meet the needs of an end-user is the ability to dynamically change the form and content of the tracking application. This implies that the application must be capable of altering the content of the display and underlying data. FIG. 13 shows the generic format and fields defined for a tracking application. These include a picture 452, a list box of tracked entities 454, and a core set of common fields 456 used for tracking.

Figure 14:
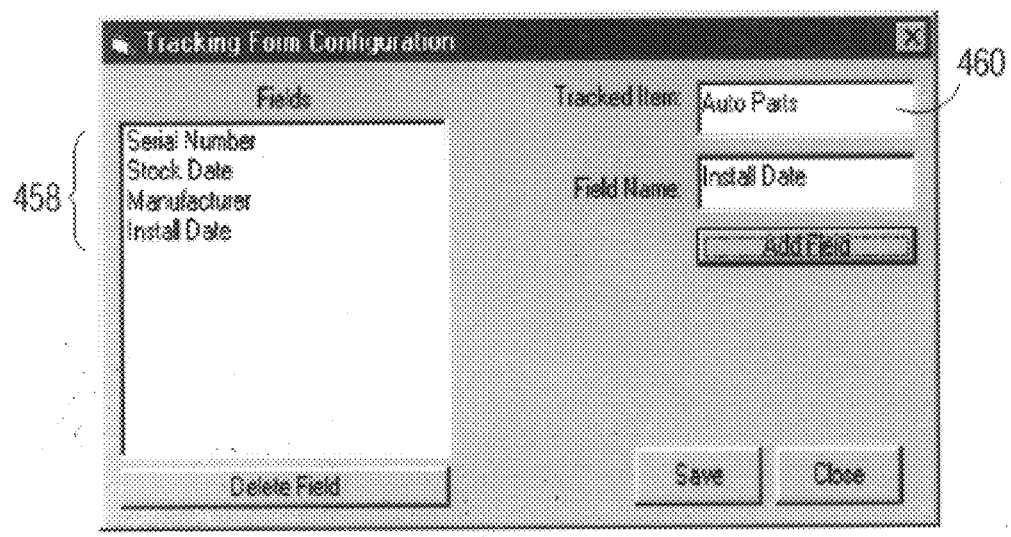
FIG. 14 is a graphical user interface screen display showing a dialog box for permitting a user to specify additional fields to the generic graphical user interface screen display in FIG. 13.
Figure 15:
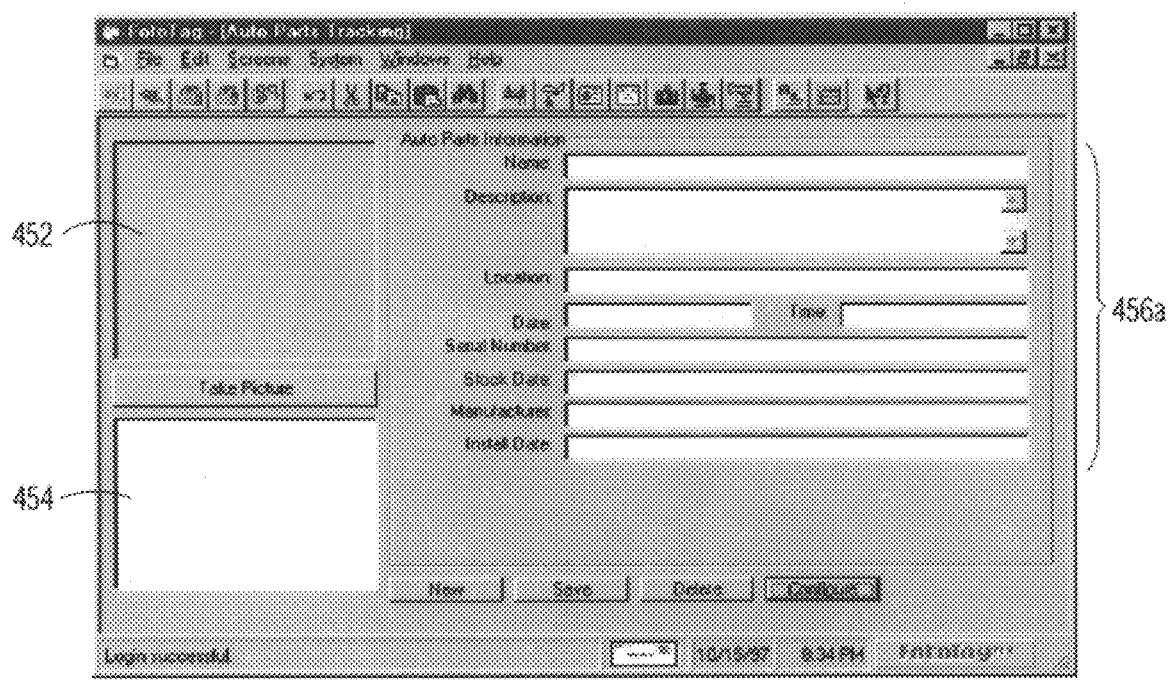
FIG. 15 shows the graphical user interface screen in FIG. 13 which has been updated to include the user defined fields set forth in dialog box of FIG. 14.

While basic form and common data fields can be defined, the application must be extensible to ensure that it will meet the specific needs and changing requirements of the end-user. Consequently, the user may customize the tracking application by dynamically defining addition data fields and items. FIG. 14 shows how the user can specify additional fields 458 for a particular tracking application. Also, the type of tracked item 460 is specified. When the fields 458 and 460 have been defined, the system is configured so that a user simply presses Save to add the fields 456a to the form shown in FIG. 13 and the database. FIG. 15 shows the generic form of FIG. 5 updated to include the user-defined fields in FIG. 14.

According to a preferred embodiment, Microsoft Windows is the development and delivery platform for the tracking system as described herein. However, it will be appreciated by those skilled in the art that the invention is not limited in this regard and other development platforms may also be used. Similarly, the target operating system according to a preferred embodiment of the invention is Windows 95/NT which is available from Microsoft Corporation. This provides a common look and feel as well as a comprehensive suite of development tools and libraries. Once again, however, the invention is not limited to the particular operating system noted, and it can also be used with any other suitable operating system.

I claim:

1. A programmable computer tracking system comprising:
    a generic application interface for receiving and processing tracking data regarding a tracked item, said generic application interface configured for user modification for a specific tracking requirement;
    a tracking engine for abstracting said tracking data provided by said generic application interface to a set of generic object models;
    each of said generic object models having a user definable set of properties and a user definable range of values assigned to said properties;
    at least one instantiated object comprising said generic object models being a tracked entity object encapsulating said tracking data pertaining to said tracked item;
    a user definable domain for describing any set of process steps for acting upon said tracked entity object in accordance with any anticipated physical flow of said tracked item; and
    a tracking router for providing said tracked entity object to a tracking station at a location for processing in accordance with said user definable domain.

2. A programmable computer tracking system according to claim 1, wherein said set of generic objects models comprises a location object defining a physical space where said item is operated upon.

3. A programmable computer tracking system according to claim 1, wherein said set of generic objects models comprises a process object defining a process which is performed in relation to said item.

4. The programmable computer tracking system according to claim 3 wherein said process object maintains a vector to the subsequent process to be performed upon said tracked entity object.

5. A programmable computer tracking system according to claim 1, wherein said set of generic objects models comprises a flow object defining a beginning and an end of a series of said processes through a business scenario associated with said item.

6. A programmable computer tracking system according to claim 1, wherein said set of generic objects models comprises a domain object for providing a high level description of said generic object models consisting of a tracked entity object, a location object, a process object and a flow object.

7. The programmable computer tracking system according to claim 1 wherein said tracking station is remotely located from a tracking server and said objects are provided to said tracking station via a computer network selected from the group consisting of an intranet and an internet.

8. The programmable computer tracking system according to claim 1 wherein a temporal projection for at least one of an anticipated process step to be performed upon said tracked item and an anticipated location of said tracked item is determined by maintaining a temporal history of processes and locations already visited by said tracked item.

9. The programmable computer tracking system according to claim 1 wherein said tracked item is a physical object.

10. The programmable computer tracking system according to claim 1 wherein said tracked item is a computer file.

11. A method for tracking a plurality of items in a domain comprising the steps of:
    providing a generic application interface configured for user modification for a specific tracking requirement;
    providing a tracking engine for receiving tracking data provided by said generic application interface and abstracting said tracking data to a set of generic object models, wherein each of said generic object models has a user definable set of properties and a user definable range of values assigned to said properties,
    generating at least one instantiated object comprising said generic object models, said at least one instantiated object being a tracked entity object which encapsulates said tracking data pertaining to said tracked item;
    allowing a user to define a domain for describing any set of process steps for acting upon said tracked entity object in accordance with any anticipated physical flow of said tracked item; and
    providing said tracked entity object to a tracking station at a location for processing in accordance with said user definable domain.

12. A method for generically tracking a plurality of items according to claim 11, further comprising the step of defining said generic objects models to comprise a location object defining a physical space where said item is operated upon.

13. A method for generically tracking a plurality of items according to claim 11, further comprising the step of defining said generic objects models to comprise a process object defining a process which is performed in relation to said item.

14. A method for generically tracking a plurality of items according to claim 11, further comprising the step of defining said generic objects models to comprise a flow object defining a beginning and end of a series of said processes through a business scenario associated with said item.

15. A method for generically tracking a plurality of items according to claim 11, further comprising the step of defining said generic objects models to comprise a domain object for providing a high level description of said generic object models consisting of a tracked entity object, a location object, a process object and a flow object.

16. A method for generically tracking a plurality of items according to claim 11 further comprising the step of locating said tracking station remotely from said tracking server and providing said objects to said tracking station via a computer network selected from the group consisting of an intranet and an internet.

17. The method according to claim 11 further comprising the step of providing a temporal projection for at least one of an anticipated process step to be performed upon said tracked item and an anticipated location of said tracked item by maintaining a temporal history of processes and locations already visited by said tracked item.

18. The method according to claim 11 wherein said tracked item is a physical object.

19. The method according to claim 11 wherein said tracked item is a computer file.

20. A programmable computer tracking system comprising:
    a user configurable interface for receiving and processing tracking data regarding a tracked entity;
    tracking engine means for providing a set of generic object models, each having a user definable set of properties and a user definable range of values assigned to said properties, said object models defining a tracked entity object for defining any object which is to be tracked, a process object for specifying any process which is to be performed on said tracked item, and a flow object defining a beginning and an end of any series of said processes through a business scenario associated with said entity;

means for providing said tracked entity object to a tracking station at a location for processing in accordance with said flow object and processing said tracked entity object in accordance with said process object.

21. The programmable computer tracking system according to claim 20 wherein said tracking station is remotely located from said tracking engine means and said tracked entity object is provided to said tracking station via a computer network selected from the group consisting of an intranet and an internet.

22. The programmable computer tracking system according to claim 20 wherein a temporal projection for at least one of an anticipated process to be performed upon said tracked entity and an anticipated location to be visited by said tracked entity is determined by maintaining a temporal history of processes and locations already visited by said tracked entity.

23. The programmable computer tracking system according to claim 20 further comprising a domain object for providing a high level description of a relationship among said generic object models.

24. The programmable computer tracking system according to claim 20 wherein said process object provides a vector to a subsequent defined process.

25. A computer tracking system comprising:

a user interface to receive from and present to a user, tracking data for any tracked entity having any set of properties, as said Tracked entity passes through any tracking domain, said user interface adapted to be configured by said user for tracking a user selected tracked entity having a user defined set of properties through a user selected tracking domain; and a tracking means communicating with said user interface for maintaining a record of a location and a status of said properties of any said tracked entity, said tracking engine adapted to be configured by said user to track said user selected tracked entity and said user defined set of properties through said user selected tracking domain.

26. The computer tracking system according to claim 25 further comprising at least one tracking station communicating with said tracking means at a location remote from said tracking means, said tracking station for updating said location and said status of any said tracked entity, said tracking station adapted to be configured by a user for updating said record of said location in said user selected tracking domain and updating said status of said user selected tracked entity.

27. The computer tracking system according to claim 26 wherein said status of said user selected tracked entity is updated in accordance with any process selected by said user for said tracking station.

28. The computer tracking system according to claim 27 wherein said process defined for said tracking station for updating said status corresponds to an action performed upon said tracked entity at said tracking station.

29. The computer tracking system according to claim 26 wherein said tracking means communicates with said tracking station via a computer network selected from the group consisting of at least one of an intranet and the Internet.

30. The computer tracking system according to claim, 26 wherein each of said tracking means and said tracking stations is comprised of a tracking engine and a tracking router.

31. The computer tracking system according to claim, 26 further comprising a tracking router communicating with said Tracking means and said tracking station.

32. The computer tracking system according to claim 31 wherein said tracking server is the repository of data concerning the user selected tracking domain.

33. The computer tracking system according to claim, 32 wherein said tracking server supports multiple user selected tracking domains concurrently.

34. The computer tracking system according to claim 25 wherein said tracking means maintains a full temporal history as well as a temporal projection of values for said user selected tracked entity.

\* \* \* \* \*